United States Patent [19]

Gabriele

[11] 4,432,130
[45] Feb. 21, 1984

[54] SIX STATION BROACHING MACHINE

[75] Inventor: Leonard A. Gabriele, Warren, Mich.

[73] Assignee: Lear Siegler, Inc., Calif.

[21] Appl. No.: 285,052

[22] Filed: Jul. 20, 1981

[51] Int. Cl.³ .................... B23Q 39/04; B23D 37/06
[52] U.S. Cl. ........................................ 29/563; 29/564; 409/272; 409/273
[58] Field of Search .................. 29/564, 563; 409/272, 409/273, 251, 259, 268, 269, 250, 252, 249

[56] References Cited

U.S. PATENT DOCUMENTS

| | | | |
|---|---|---|---|
| 1,318,487 | 10/1919 | Donaldson | 409/250 |
| 1,627,755 | 5/1927 | Urschel | 409/269 X |
| 1,857,516 | 5/1932 | Oakley | 409/273 X |
| 2,072,563 | 3/1937 | Lynch et al. | 409/252 |
| 2,203,798 | 6/1940 | Romaine | 409/273 X |
| 2,280,229 | 4/1942 | Groene et al. | 409/272 |
| 2,307,228 | 1/1943 | Monroe | 409/273 X |
| 2,343,420 | 3/1944 | Podesta | 409/250 |
| 2,893,293 | 7/1959 | Poynter | 409/273 |
| 3,799,030 | 3/1974 | Schubert | 409/259 X |

Primary Examiner—William R. Briggs
Attorney, Agent, or Firm—Barnes, Kisselle, Raisch, Choate, Whittemore & Hulbert

[57] ABSTRACT

An automatic machine tool for sequentially machining a plurality of parallel surfaces on a plurality of work pieces, in which the work pieces are locked in position on an index table, and the surfaces machined in one operation are angularly disposed to the surfaces machined in a contiguous operation as a result of revolving the work pieces about the axis of the table.

11 Claims, 19 Drawing Figures

SIX STATION BROACHING MACHINE

BRIEF SUMMARY OF THE INVENTION

The present invention relates to a machine and method for machining a plurality of angularly related surfaces on each of a sequence of work pieces in a succession of cycles in which parallel surfaces are machined on a plurality of work pieces at each cycle, and a second set of parallel surfaces, disposed at an angle to the surfaces machined in a preceding cycle, are machined in a succeeding cycle.

In a particular embodiment of the invention, the work pieces are of generally annular configuration, and the surfaces machined thereon in accordance with the present invention are six diametrically extending slots disposed at angles at 60° to each other. The work pieces are supported in the machine in a circular array and are circumferentially spaced at 60° intervals. With this arrangement it will be seen that two adjacent work pieces occupy a straight line which is parallel to a straight line occupied by the two work pieces at the opposite side of the array, and that the two remaining work pieces occupy a straight line extending diametrically across the array, which is parallel to the first mentioned straight lines.

With this arrangement, each of the six work pieces may simultaneously be provided with parallel diametrically extending machined surfaces by effecting relative rectilinear travel between the array of work pieces and three machining devices, such as elongated broaches. In the next successive cycle, the relative rectilinear travel may be in a path located at an angle of 120° to the path of relative travel at the first cycle. This will provide each work piece with a diametrically extending machined surface disposed at an angle of 60° to the first machined surfaces. The next cycle of the machine provides for relative rectilinear travel between the machining devices and the array of work pieces in a path located at an angle of 120° to the path of relative travel at the preceding cycle. This will complete the provision of three diametrically extending machined surfaces on each work piece, or six radially extending surfaces spaced at 60° intervals. Typically the machined surfaces are slots.

The foregoing may be accomplished in an endless succession of cycles, in which the work pieces are clamped in work supports on a table which is indexed through 120° between each machining cycle. Two work pieces are loaded on the table between consecutive index rotations, and two finished work pieces are discharged during each index rotation of the table.

The machining operation is performed by three broaches traversed across the table between each index rotation thereof in parallel spaced paths, each path extending diametrically across two of the six work pieces. Since each index rotation of the table revolves the work pieces through 120°, each work piece is in effect rotated about its axis through an equal angle, and the three broaching operations or cycles form six radial slots at 60° intervals in annular work pieces.

The provision of six radial slots at 60° intervals is exemplary only, and the number of work pieces, machining devices, and index increments may be selectively changed to form different numbers of surfaces at different angular relationships.

In practice, it is preferred to reciprocate the broaches in the same path forwardly in cutting stroke and reversely in return idle strokes. To avoid dragging the broaches rearwardly over machined surfaces, the table is raised into cutting position after each index rotation, and lowered into clearance position after each cutting operation.

The machine is designed for fully automatic operation and switches are provided as required to sense completion of each phase of the operation and into initiate the next. Since the provision of switches for this purpose is commonplace in automatic machine tools, the disclosure herein is simplified by omitting description and usual illustration of such control switches.

In general terms, a succession of work pieces are advanced to a loading station, at which two or more work pieces are loaded simultaneously. The work pieces illustrated herein are generally flat and annular in shape and are advanced in a conveyor inchute in a solid array. The particular work pieces for which the machine was designed have low protuberances on their outer surface, but might have truly cylindrical, or other shaped outer surfaces.

An indexable work table is provided with a plurality of substantially radially open work receiving and locating pockets. Since the machine is fully automatic, self locking retainers are provided which clamp work pieces firmly in the pockets when pushed into the pockets.

Where as here illustrated the number of pockets is six, a pusher is provided which pushes two non-adjacent work pieces from a solid array into the pockets located at opposite sides of a line radial of the table, and latched in place of spring pressed clamps. Locking wedges are retained in retracted position, and when the wedges are subsequently released, strong springs push them firmly into docking engagement with the work-holding clamps.

The wedges have projections thereon which are engaged by stationary cam means as the table is indexed to return the associated work-receiving pockets to the loading station. At the same time, the finished work pieces engage the spring-pressed ejectors, so that when the wedge locks are cammed to open position, the two finished work pieces are ejected into an outchute.

Vertical movement of the index table is accomplished by a hydraulic piston and cylinder device, and index rotation of the table is accomplished by a reversible rotary hydraulic motor and a pawl and ratchet connection between the motor and table.

The work pieces are precisely located in the pockets of the table, and the table is located by shot pin locators so that the slots are machined with corresponding precision by the broaches.

DETAILED DESCRIPTION

Figure 1:
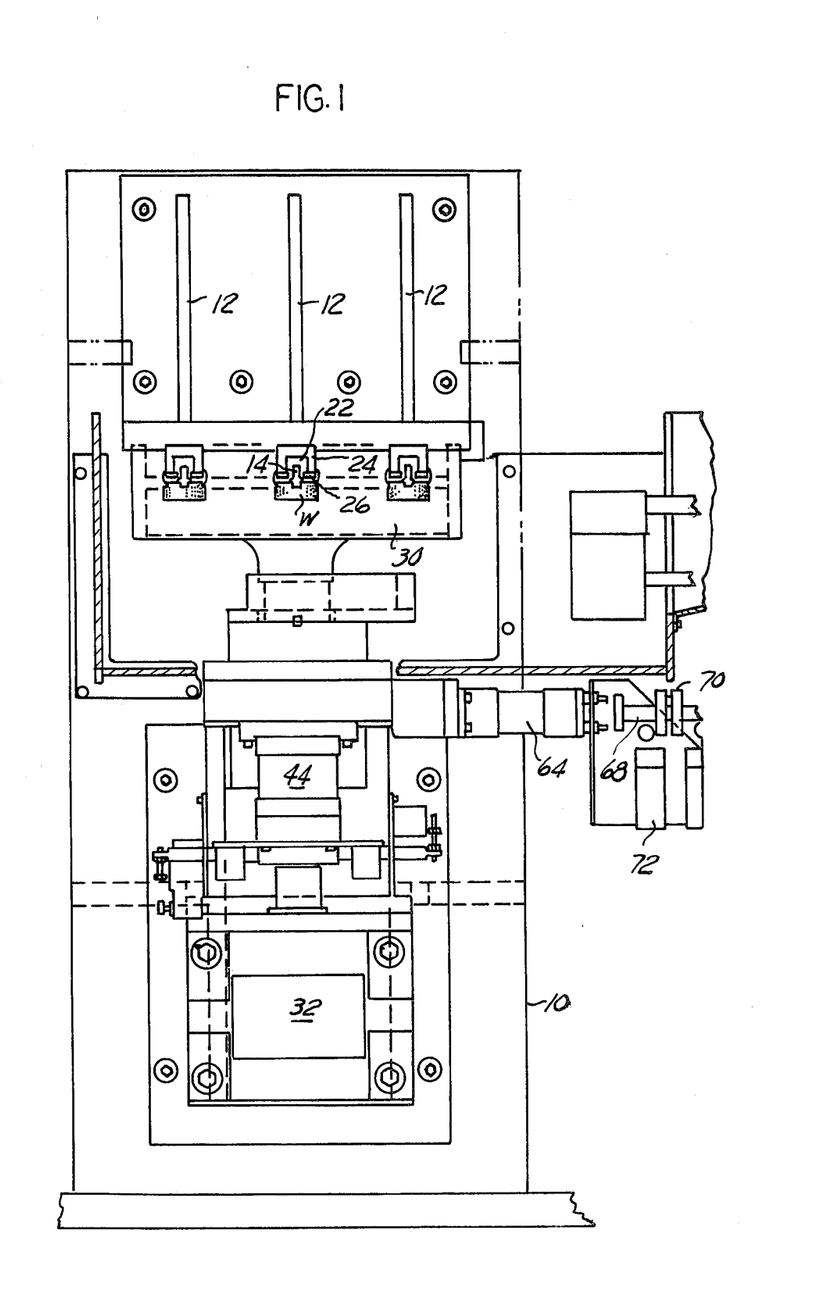
FIG. 1 is a front elevation of the complete machine.
Figure 2:
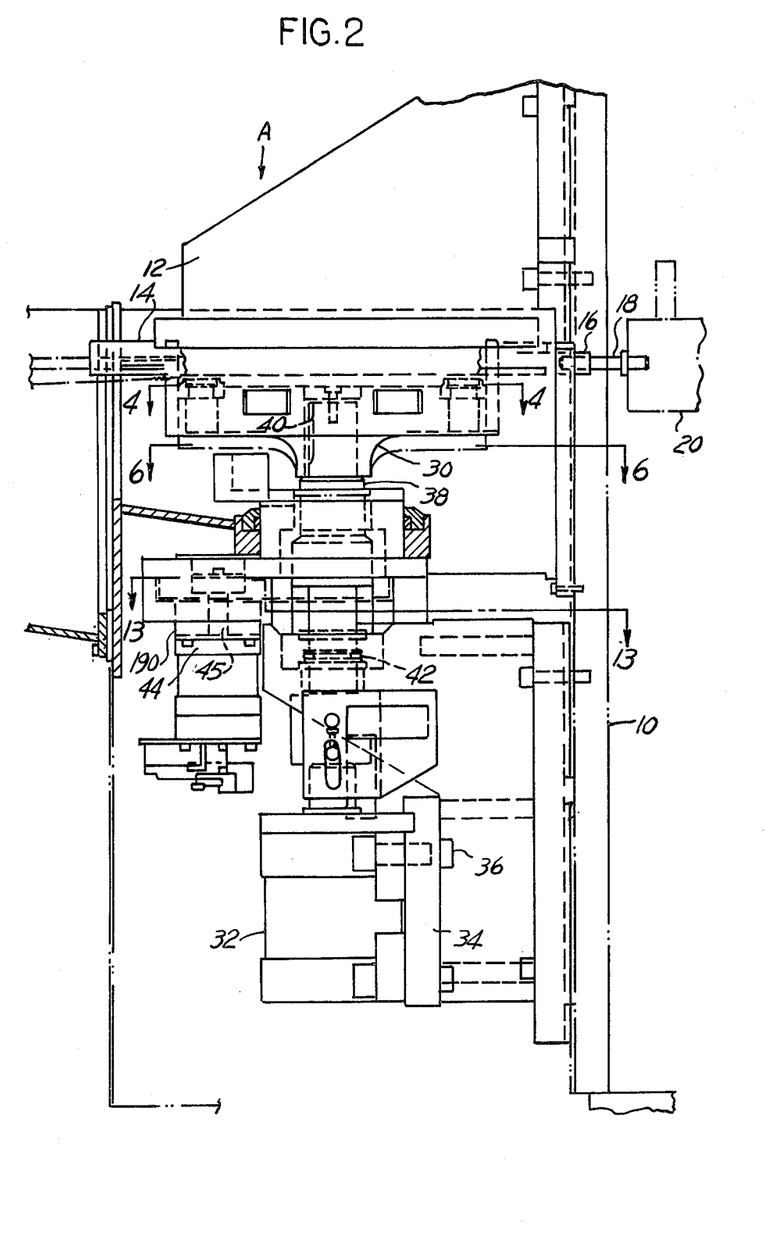
FIG. 2 is a side elevation of the machine with parts in section.

The machine comprises a relatively massive frame 10 provided with stiffening plates 12 at the top and including a plurality of straight elongated broaching tools 14 which in the present instance are three in number. The broaches are secured to a broach puller, a portion of which is indicated at 16 and which is connected to the piston 18 of a hydraulic cylinder 20. Suitable guides position the broaches for horizontal longitudinal reciprocation transversely of the machine and the cylinder 20 is provided with suitable connections to reverse the broach travel to initial position after each cutting stroke. These guides are well illustrated in FIG. 1 which show the broaches mounted in broach holders 22 slidable in elongated guide channels 24 partially closed at the bottom by guide plates 26. In this figure the work pieces W are seen to be mounted in a rotatable index table 30 by means later to be described.

The table 30 is mounted for limited vertical reciprocation in the frame and for this purpose is connected to a hydraulic lift cylinder 32 bolted to a mounting plate 34 which is a welded part of the frame 10, as by bolts indicated at 36. Since the table is repeatedly indexed during operation of the machine, a drive shaft 38, keyed to the table as indicated at 40, is rotatably supported by bearing means 42.

Vertical movement of the table is monitored by suitable switch means, not described in detail, which initiate up or down movement of the table in proper sequence to broach operation and indexing of the table.

In the present case, the table is repeatedly indexed through 120° and this is accomplished by means of a reversible hydraulic motor 44 having an upwardly extending drive shaft 45 keyed to a pawl disk 46 having a spring-pressed pawl 48 associated with three ratchet recesses 50. Rotation of the pawl plate is limited to a little over 120° by stop pins 52 and adjustable stop bolts 54.

Ratchet recesses are formed at 120° intervals in drive gear 47, which in turn is fixed to drive shaft 38 so that on forward and reverse operation of index motor 44, the table 30 is indexed in one direction through an index angle of approximately 120°. However, the indexed position of the table is critical to the final location of the slots in the work pieces, and to insure a positive accurate preliminary location, a pointed locating or shot pin 56 is slidable in a guide sleeve 48 and its pointed nose is received in one of three v-shaped locating notches 60 provided in a plate 62 at precisely located 120° intervals. An additional tapered locating pin is associated with the table as will subsequently be described.

Figure 13:
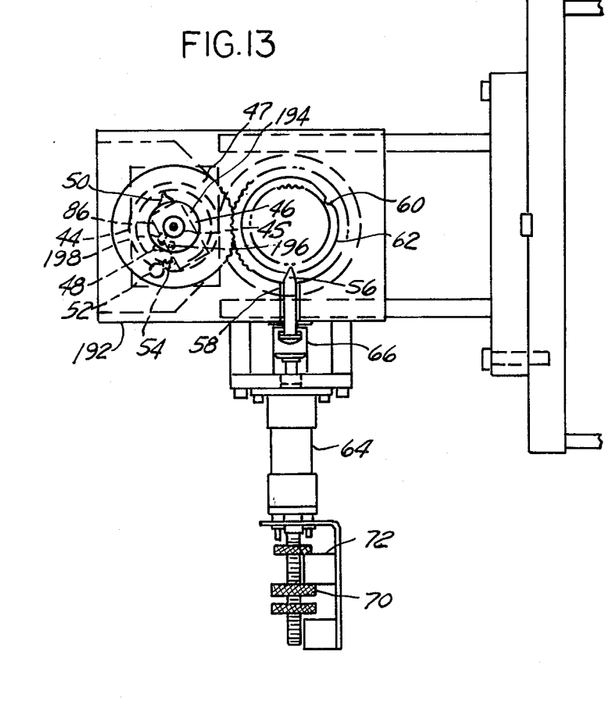
FIG. 13 is a section on the line 13—13, FIG. 2.
Figure 13A:
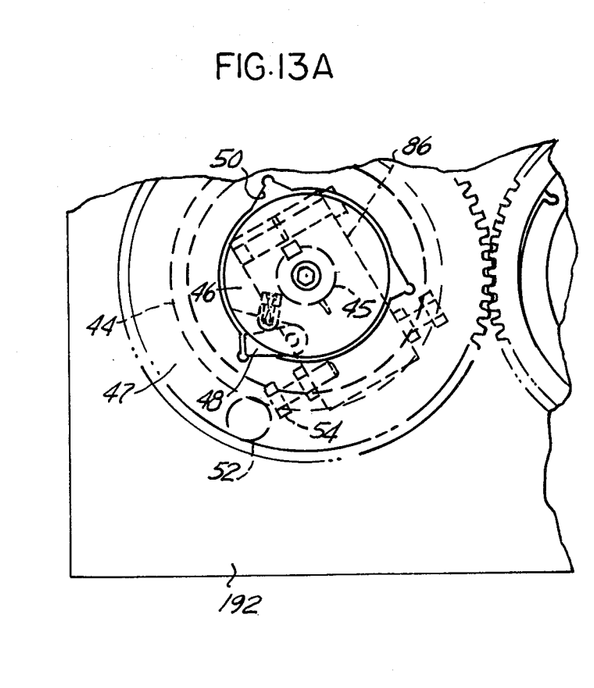
FIG. 13A is a fragmentary enlargement taken from FIG. 13.

While no effort has been made to illustrate all of the condition responsive switches, FIG. 13 shows a cylinder 64 connected to the plunger or shot pin 56 by a coupler 66, and the piston within the cylinder is connected to a switch rod having adjustable switch actuating nuts 70 cooperating with a cycle control switch means 72, which interrupts the cycling of the machine unless pin 56 seats fully in recess 60.

Figure 15:
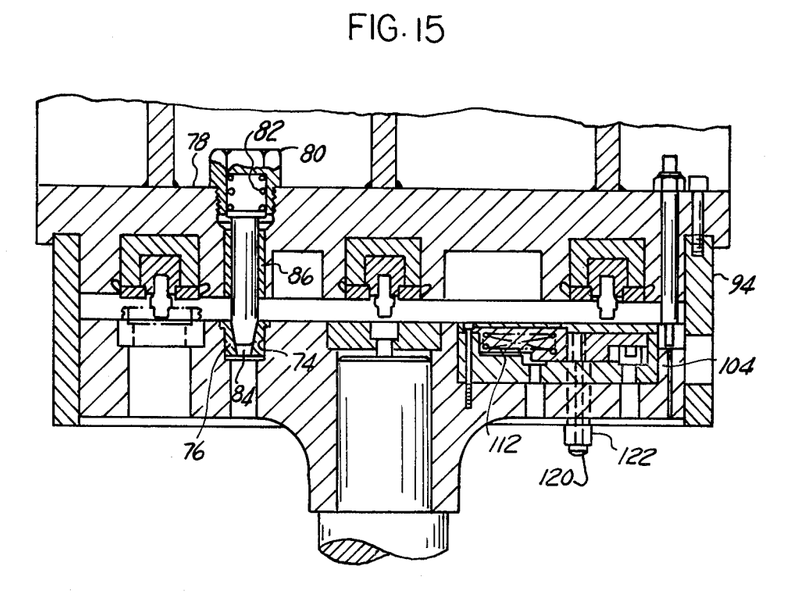
FIG. 15 is a section on the line 15—15, FIG. 3.

The shot pin 56 and v-shaped recesses locate the table substantially exactly in the required portion for a machining operation, but in order to precisely locate the table and hold it under lateral stress occasioned by the broaching operation, the table is provided at its top with three recesses 74 which receive tapered locating bushings 76 as best seen in FIG. 15. A top fixture support plate 78 secured to the top of the frame carries a threaded spring retainer 80 which receives compression spring 82 bearing against the head of tapered locating pin 84 slidable in bushing 86. As the table is elevated against abutment means into cutting position following each indexing thereof, it is positively and firmly positioned by engagement of the pin 84 in one of the tapered bushings 76.

Figure 4:
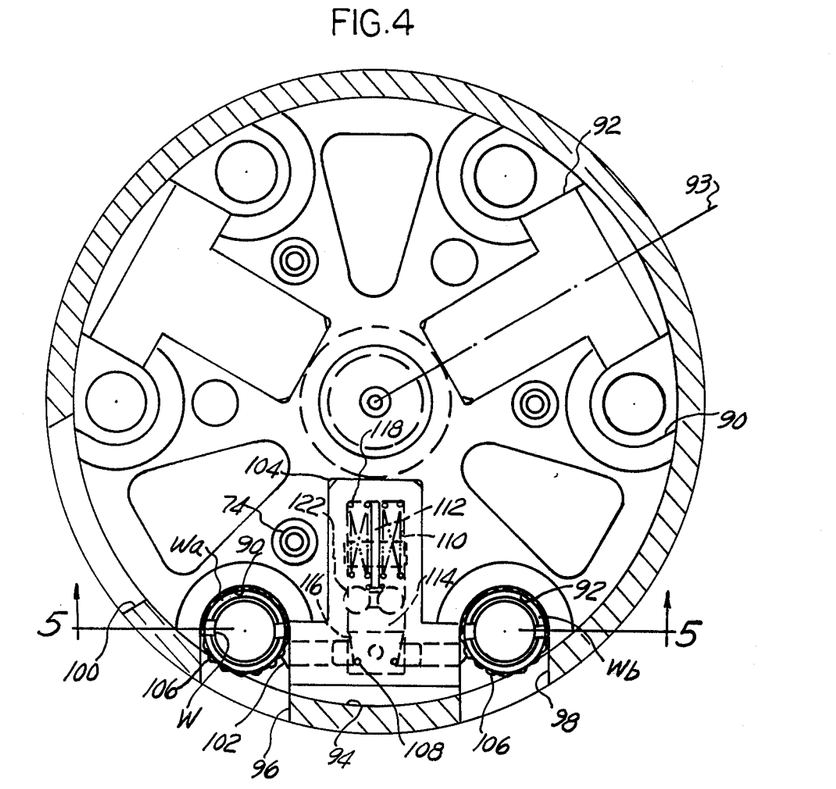
FIG. 4 is a section on the line 4—4, FIG. 2.

As best seen in FIG. 4, the index table has three pairs of pockets 90, 92. The pockets are located laterally of a radial line 93 and are shaped to receive a pair of work pieces advanced simultaneously by a pusher, later to be described. The table is rotated inside a fixture ring 94 and this in turn is provided with loading ports 96 and 98 registering respectively with pockets 90 and 92 at the loading station. The ring 94 is further provided with an unloading opening 100 of substantial circumferential extent through which finished work pieces are sequentially ejected as will later be described.

The pockets 90, 92 of each pair are provided with independently movable clamps 102 in a clamp insert or housing 104, the clamps having noses engageable with work pieces W inserted in the pockets. The particular machine illustrated operates on work pieces having circumferentially spaced, radially outwardly extending lugs shown at 106. The clamps are slidable toward and away from each other, and a light compression spring 108, mounted on spring retainer pins as shown, is interposed between each pair of clamps. Spring 108 is strong enough to latch the work pieces in the pockets, but by no means capable of holding them under the stresses applied during the broaching operation.

To provide this support, the fixture housing is provided with two chambers 110 separated by a partition plate 112, and in each chamber there is provided a clamp wedge 114, each having an angular wedging surface 116 engaging a correspondingly angular surface on the associated clamp 102. Relatively strong springs 118 are located in chambers 110 and urge the clamp wedges 114 outwardly to move the clamps 102 solidly against the work pieces.

It may be noted that in this instance, the angular orientation of the slots machined into the end of a work piece is random with respect to the location of lugs 106, but the angularity between the slots is significant. Accordingly it is important that after each work piece is clamped in its pocket, it must be retained therein without shifting until the final broaching operation is complete.

In order to retract the clamp wedges 114 to permit the work pieces to be snapped into place behind the spring biased clamps 102, each wedge is provided with a downwardly extending stud 120 carrying a cam engaging roller 122. As will subsequently be described, wedges 114 are retracted when the associated pockets 90, 92 are at the loading station, but are released during elevation of the table prior to the initial broaching operation in the cycle composed in this instance of three indexing and three broaching operations.

Figure 5:
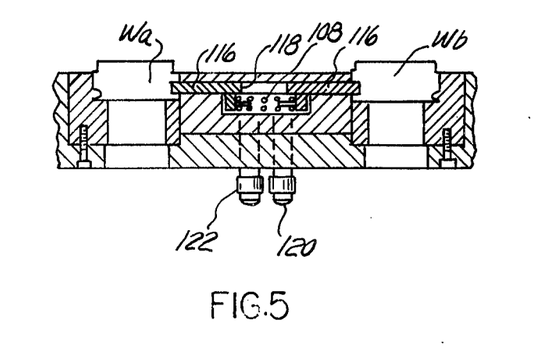
FIG. 5 is a sectional view on the line 5—5, FIG. 4.
Figure 6:
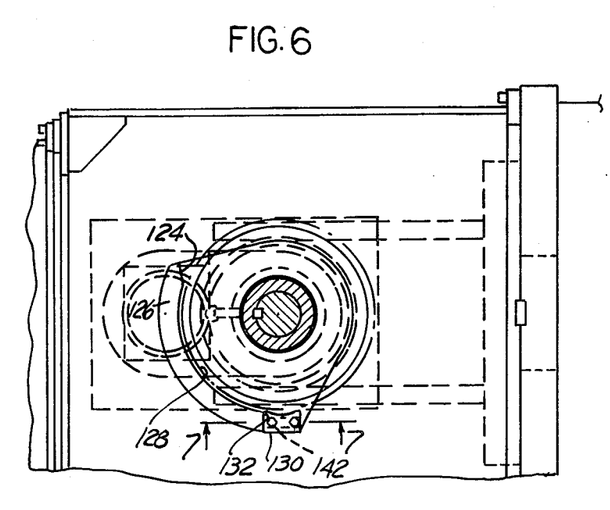
FIG. 6 is a sectional view on the line 6—6, FIG. 2.
Figure 6A:
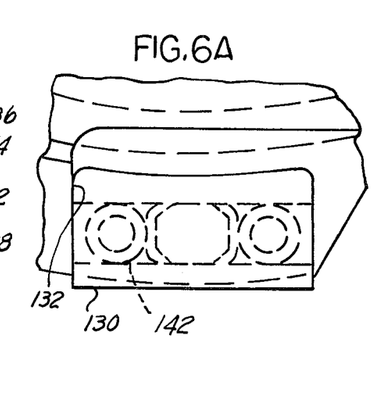
FIG. 6A is an enlarged plan view of the parts shown in FIG. 6.
Figure 7:
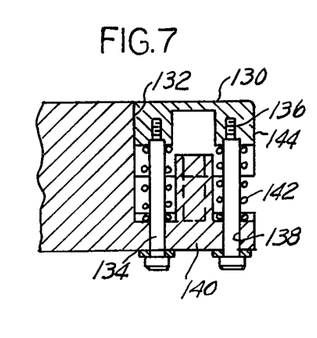
FIG. 7 is a section on the line 7—7, FIG. 6.

The mechanism for automatically controlling locking and unlocking the work pieces is best seen in FIGS. 6 and 7, taken in conjunction with FIGS. 4 and 5 as previously described. The clamp wedges 114 when free to move are moved substantially radially outwardly by compression springs 118, and each moves its associated clamp 102 into firm clamping engagement with its work piece W. As the table 30 is indexed, and raised and lowered in timed relation, the clamp wedges remain in wedging position and the work pieces remain in locked wedge position as they are broached in the three successive broaching operations. After the two work pieces to the left of the two pockets at the initial broaching station have been broached, the table is lowered to clear the broaches, and is then indexed to the loading station as seen at the bottom of FIG. 4. At this time cam rolls 122 on studs 120 engage an inclined cam surface 124 on an unloading cam 126 fixed to the frame, and are forced inwardly, thus retracting wedges 114, and leaving clamps 102 urged in latching engagement with work pieces W only by relatively light bias spring 108. As will subsequently be described, work pieces are ejected from their pockets during index rotation of the table before the pockets reach the loading station.

As best seen in FIGS. 6 and 7, cam 126 has an arcuate surface 128 on which rollers 122 ride as they approach the loading station. At the loading station, the cam 126 is provided with a segment 130 mounted in cutout end portion 132 of the cam which is guided for vertical movement by pins 134 having a threaded engagement, as seen at 136, the pins being slidably received in openings 138 in a ledge 140. Springs 142 surround pins 134 and bias segment 130 upwardly to the position seen in FIG. 7. At this time surface 144 of the segment forms a continuation of arcuate cam surface 128, and retains the clamp wedges retracted to provide for insertion of two new work pieces in the pockets 90, 92.

After the two work pieces have been inserted in their respective pockets, and are retained therein by clamps 102, the table is raised to initial machining position, for the two newly inserted work pieces. During upward movement of the table cam rollers 122 pass above cam segment surface 144, which releases the wedges 114 and permits them to be moved by springs 108 into positive wedging relation to clamps 102, thus positively locating the work pieces for the three successive broaching operations.

After the initial broaching on the two work pieces identified in FIGS. 4 and 5 as Wa and Wb, and before broaches 14 are moved in their idle return strokes, the table 30 is lowered preparatory to an index rotation of the table. During this downward movement of the table, the lower ends of studs 110 engage the track segment and depress it against the action of the springs 142. Accordingly the track segment 130 retains wedges 114 retracted as the pockets 90, 92 move into the loading station to receive work pieces Wa and Wb, but permit lowering of the table to position the pockets 90, 92 with work pieces Wa and Wb therein following their initial broaching operation, without interference.

Referring now primarily to FIGS. 8-12, the loading mechanism comprises an inclined inchute 236 having side rails 238 and a ride rail 240. Rollers 242 are supported on stub spindles 244 fixed to side rails 238. The work pieces W may be supplied to the inchute 236 by an automatic feeder of known type, so that a solid array of work pieces is maintained in the loader, and spaces occasioned by displacing a pair of pieces into the machine are immediately filled by advance of the pieces.

Figure 8:
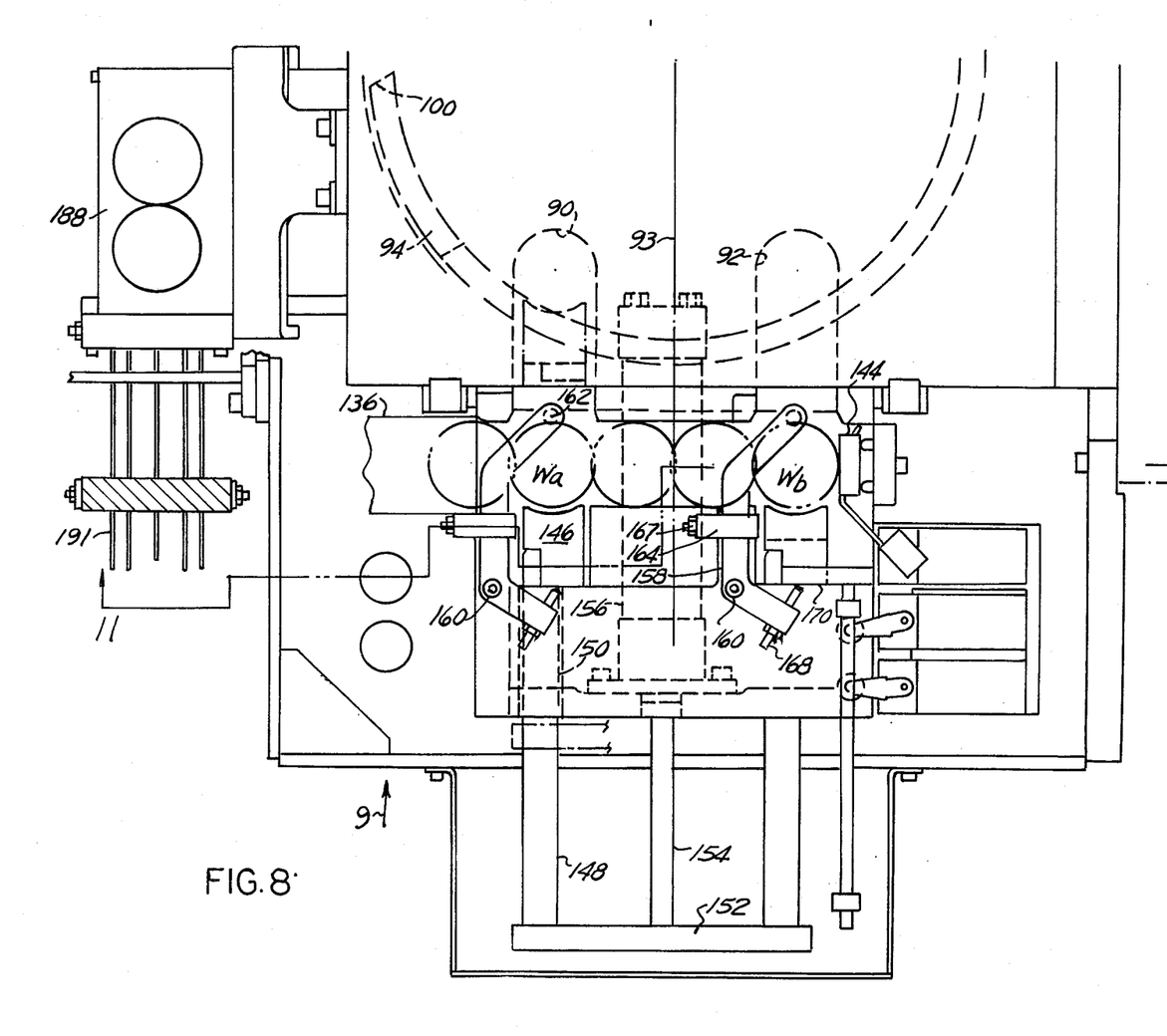
FIG. 8 is a partial plan view showing details of the loading and unloading mechanisms.
Figure 9:
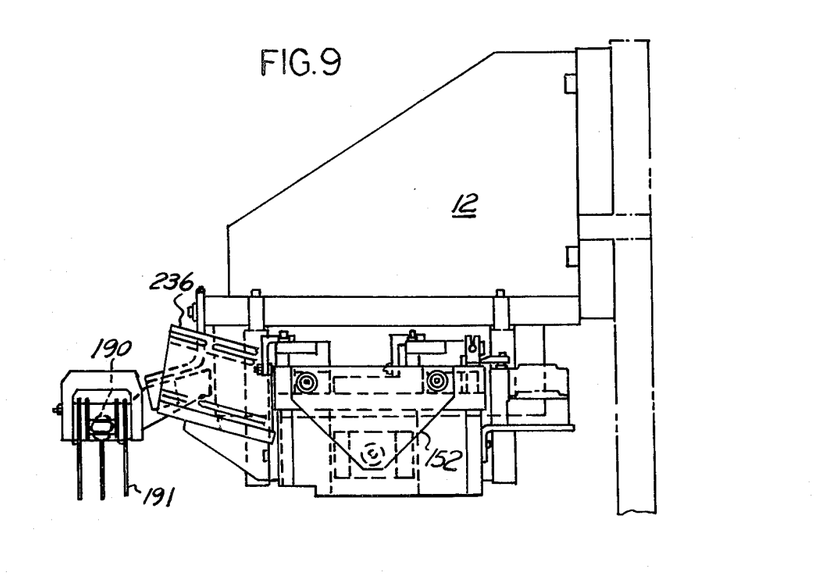
FIG. 9 is an elevation of the structure of FIG. 8, as seen in the direction of arrow 9.
Figure 10:
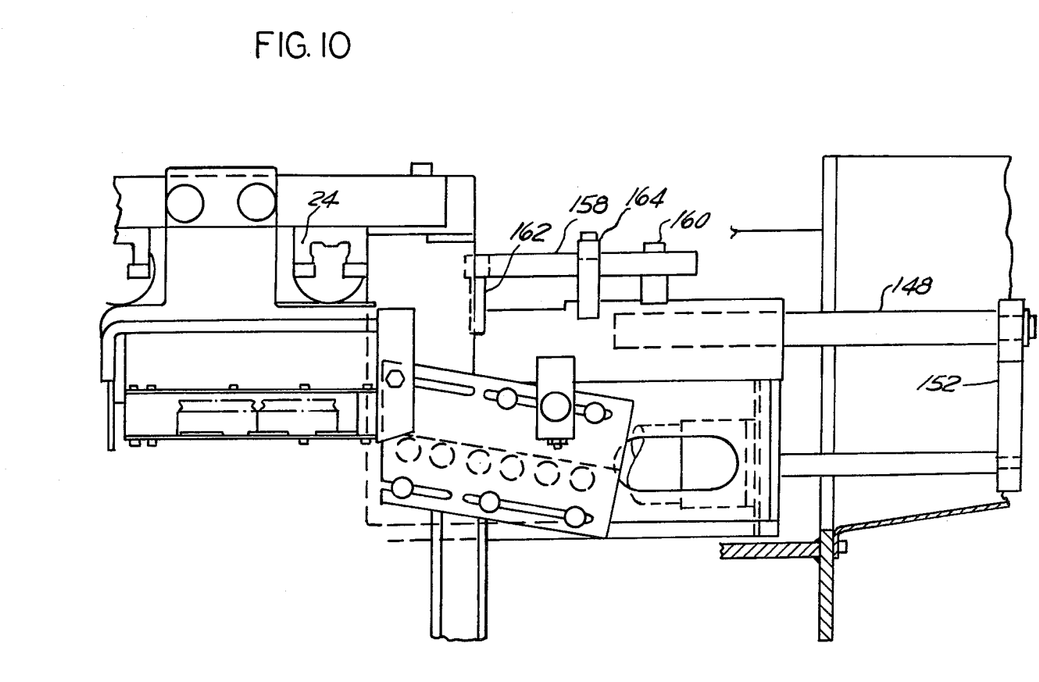
FIG. 10 is an elevation of the structure of FIG. 8, as viewed in the direction of arrow 10, FIG. 8.
Figure 11:
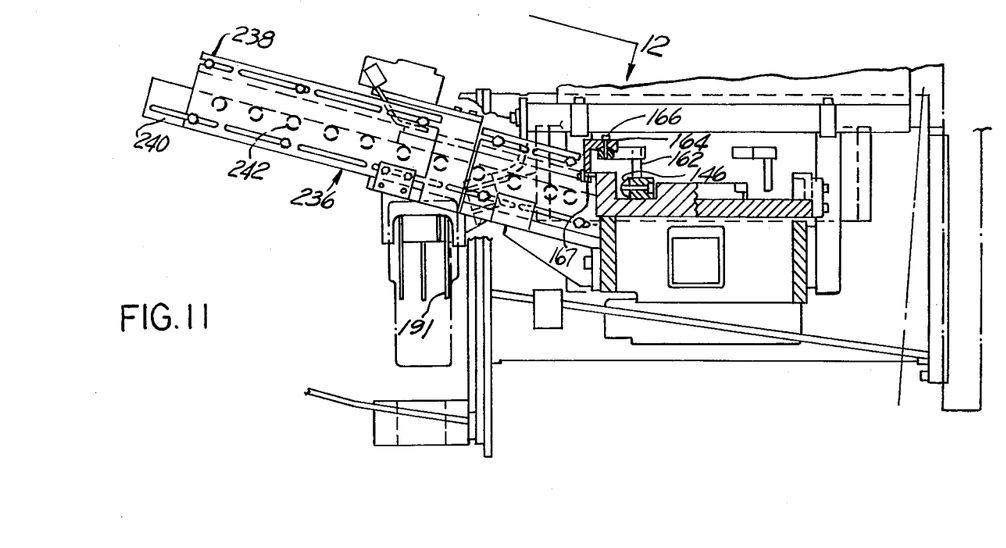
FIG. 11 is a section on the line 11—11, FIG. 8.
Figure 12:
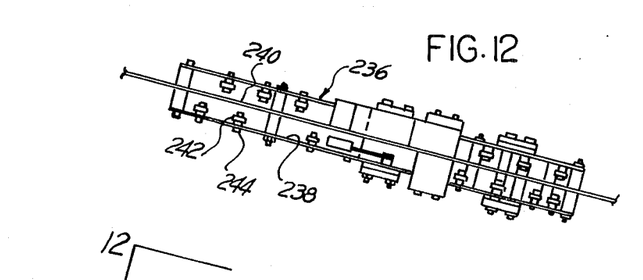
FIG. 12 is a fragmentary plan view in the direction of the arrow 12, FIG. 11.

As best seen in FIG. 8, the leading work piece, which is one of the two whose progress through the machine will be described in detail, is the previously identified work piece Wb, and it engages a stop block 144. It will be noted that at this time separate pushers 146 are in alignment with the leading space Wb and with the fourth from the leading piece, designated Wa. Pushers 146 are actuated by bars 148 which extend through openings in guide bushings 150, the ends of bars 148 remote from the pushers being connected to a rigid pusher plate 152 which in turn is connected to the piston 154 of loading cylinder 156. The cylinder is actuated in proper sequence to advance work pieces Wa and Wb into pockets 90, 92, and then pushers are retracted, the work pieces being retained in their respective pockets by clamps 102.

At the loading station arms 158 are pivoted to the frame by screws 160 and have pins 162 which are positioned in front of the work pieces Wa and Wb. Arms 158 have stops 164 secured thereto by screws 166, and have adjustable stop screws 167 which limit swinging of the arms in a clockwise direction as seen in FIG. 8 to the illustrated position.

Stop screws 168 engage abutments 170 on pushers 146.

With the parts in the stop position seen in FIG. 8, pins 162 prevent migration of the work pieces into the openings in the ring surrounding the table 30 and the pockets 90, 92. However, as the pushers advance, the arms are permitted to swing to move pins 162 out of the path of movement of the work pieces. As the pushers are retracted, arms 158 are rotated clockwise by pins 168 and surface abutments 170 to again position the pins 162 in stop positions.

The mechanism for ejecting finished work pieces from the machine is best illustrated in FIGS. 3, 4, 6, 8-11 and 16.

As previously noted, ring 94 has a circumferentially enlarged exit port 100, since, as will later appear, the finished work pieces are ejected during index rotation.

Figure 14:
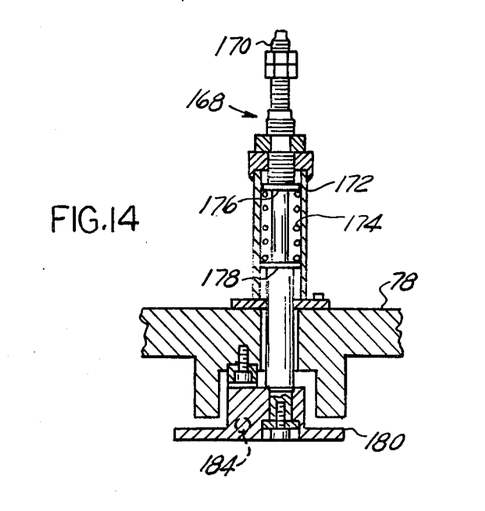
FIG. 14 is a partial section on the line 14—14, FIG. 3.

The locking and unlocking wedging action of wedges 114 has been described and it will be recalled that during index rotation from the third machining station, wedges 114 are positively retracted by cam 126 (FIG. 6). This leaves the finished work pieces held only by spring urged clamps 102. Mounted on stationary support plate 78 is a resilient ejector device 168 comprising an elongated shaft 170 slidable longitudinally and rotatable in a housing 172. A compression spring 174 is received between flange 176 and a washer 178 and biasing shaft 170 downwardly as seen in FIG. 14. The vertical movement of shaft 170 is to accommodate vertical movement of the table 30.

Figure 3:
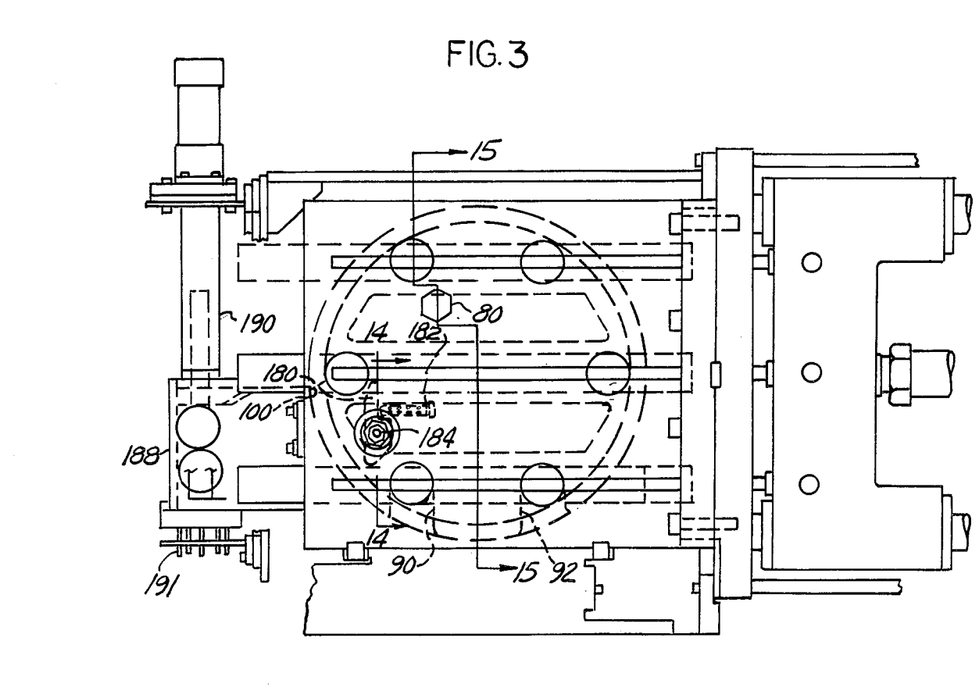
FIG. 3 is a plan view of the machine.
Figure 3A:
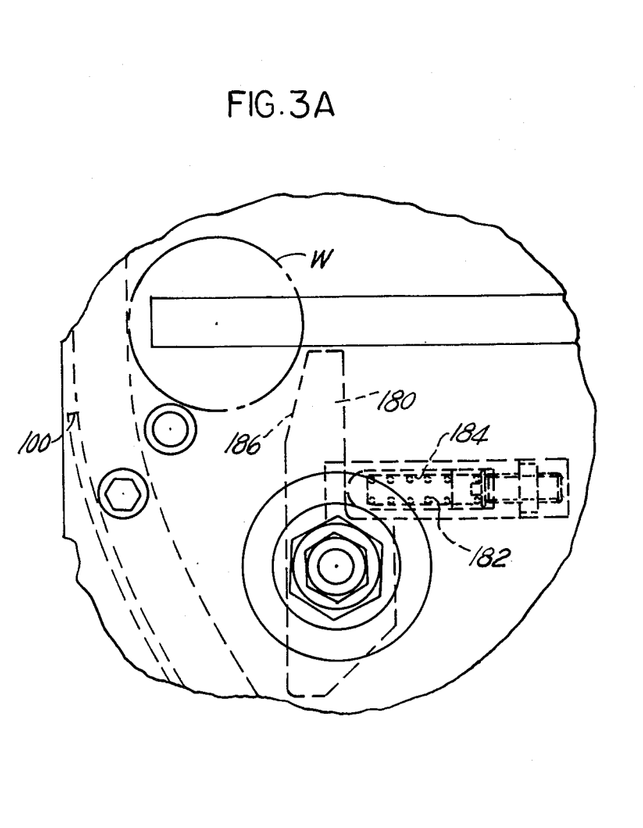
FIG. 3A is an enlarged detail view of the ejector seen in FIG. 3.

Carried by the lower end of shaft 170 for rotation about the longitudinal axis of the shaft is an ejector finger 180. The finger is biased in a counterclockwise direction as viewed in FIGS. 3 and 3A by a compression spring 182 within a plunger 184 cooperating with finger 180. The finger has an inclined camming surface 186 which during the final index rotation of a pair of work pieces is successively engaged by the work pieces and is rotated clockwise as seen in FIG. 3, thus compressing spring 182. When the torque on finger 180 builds up to a value sufficient to overcome spring 108 acting on clamps 102, the finger snaps the finished work pieces successively out of their pockets in the table 30 and through the opening 100 in ring 94, into the outchute receiver 188, from which they are delivered by hydraulic pusher means 190 to outchute 191.

The table 30 is indexed by a reversible hydraulic motor connected through a pawl and ratchet device to the table, as previously described.

Figure 16:
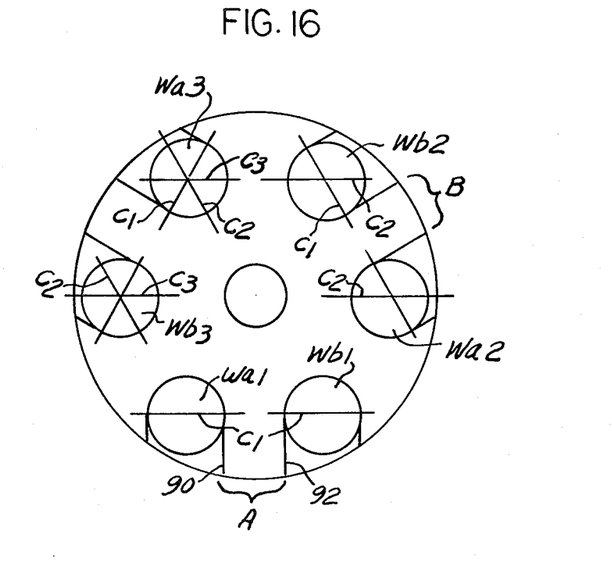
FIG. 16 is a diagram illustrating the sequence of steps.

In describing the complete operation, reference is now made to the diagram of FIG. 16.

The table 30 is illustrated and the succession of stop will be described with reference to the two work pieces Wa and Wb previously identified in FIGS. 4 and 5.

It will be understood that the forward cutting stroke of the three broaches 14 takes place when the table is elevated to what will be referred to a cutting position, and that thereafter the table is lowered to loading and unloading position.

Assume for simplicity that the table in index position A, that it is in lowered loading position, that an array of work pieces are at the loading station, and that no work pieces are in the pockets designated 90 and 92. These conditions are sensed by suitable control sensor associated with control switches as is well known in the art, and pressure is admitted to the cylinder to actuate the pushers to push workpieces Wa and Wb into the pockets 90 and 92 respectively, where they are retained temporarily by spring biased clamps 102 while locking wedges 114 are held retracted by cam surface 144 of cam segment 130. When the pushers 146 are retracted, the table while retaining work pieces Wa and Wb in index position A, is raised to cutting position. As it rises, cam rolls 122 rise above the cam segment and the wedge springs 118 force the wedges into firm wedging engagement with the clamps. This locks the work pieces Wa and Wb in their respective pockets, a condition which continues to exist until the cutting of all slots is complete.

As the table reaches the elevated initial cutting position (as far as work pieces Wa and Wb are concerned), it is very accurately adjusted into cutting position by entry of tapered locating pin 84 into tapered bushing 76.

Broach puller cylinder 20 is energized, and the three broaches are advanced in a cutting stroke, forming cuts C 1 in the two work pieces, whose index position at this time is designated Wa 1 and Wb 1. The broach movement is horizontal as seen in the diagram of FIG. 16.

After completion of the initial cutting stroke, and before the broaches are returned to initial position, table 13 is lowered to its initial loading position. At this time, the ends of studs 120 engage the vertically yieldable cam segment 130 to move it downwardly to a non-interfering position.

At this time the table is indexed while in its lowered loading and unloading position to index position B. The cuts C 1 which were broached into pieces Wa and Wb, due to revolution of the pieces about the vertical axis of the table now occupy the position illustrated for the work pieces as they have moved from initial loading and cutting index positon where they are designated Wa 1 and Wb 1, to the second index position where the same work pieces are designated Wa 2 and Wb 2. In index position B, the table is again elevated to cutting position, and traverse of the three broaches cuts slot C 2 therein, which extend at an angle of 120° to slots C 1.

Thereafter the table is lowered, the broaches are retracted, and the table indexed to index position C. The broaches again advance in a cutting stroke and slots C3 are formed in the pieces, now designated as Wa 3 and Wb 3. The work pieces are now finished and ready for ejection from the machine. This is accomplished by again lowering the table to loading, unloading and indexing position while it remains in index position C. The next index rotation moves pockets 90 and 92 containing finished work pieces from the position in which they are designated Wa 3 and Wb 3 to initial loading position. During this index rotation, the finished work pieces are released from locked position by retraction of wedges 114 by engagement between cam rolls 122 and cam surfaces 124 and 128 and the continuation of surface 128 by surface 144 of cam segment 130. This releases the pieces for ejection but they are resiliently retained by spring pressed clamps 102.

As index rotation takes place from station C to station A, the pieces successively engage spring pressed ejection finger 180 and displace it against bias spring 182. When the force exerted as a result of compression of this spring reaches a sufficient valve, the latching effect of the clamps is overcome and the pieces are snapped into the discharge receiver 188, and exit from the machine on conveyor 191.

I claim:

1. A machine tool for machining a plurality of relatively angularly disposed surfaces on each of a plurality of identical workpieces in a succession of identical repeated machine cycles, which comprises:
    a stationary frame,
    a rotatable table,
    index mechanism for successively rotatively indexing said table about an axis in predetermined equal steps such that said table completes exactly 360° rotation in a predetermined number of index rotations,
    a plurality of machining mechanism mounted on said frame for rectilinear traverse relative to said table in identical parallel forward machining strokes perpendicular to the axis of said table and return idle strokes,
    a plurality of work holders on said table each effective to clamp a workpiece on said table in fixed relation thereto, said work holders being equally spaced radially from the axis of rotation of said table and equally angularly spaced thereon,
    each of said machining mechanisms comprising means for machining surfaces at each traverse stroke on a plurality of workpieces which are perpendicular to the axis of the table but which surfaces, due to the different indexed positions of the workpieces, are angularly positioned with respect to each other on each workpiece by an amount related to the index rotation of each workpiece between successive cuts,
    means for alternately actuating said machining mechanisms in rectilinear machining strokes and for actuating said index mechanism in repeated cycles to machine surfaces of said workpieces at each cycle which are angularly disposed to surfaces machined during a contiguous cycle.

2. A machine tool as defined in claim 1, which comprises a loading station comprising loading means for supplying at least one work piece to a work holder on said table located at said loading station between successive index rotations thereof.

3. A machine tool as defined in claim 2, which comprises an unloading station comprising unloading means operable to release at least one completed work piece from its holder and to eject the completed work piece from the machine during an index rotation of said table prior to arrival of said holder at said loading station.

4. A machine tool as defined in claim 3, in which said index mechanism is effective to advance said table at each index operation through an arc equal to twice the angular spacing between adjacent holders, in which the number of holders is even, and in which the loading means comprises means for simultaneously loading a pair of work pieces into a pair of adjacent holders.

5. A machine tool as defined in claim 4, in which said unloading means comprises means effective to unload a pair of adjacent holders during the index rotation of said table which moves said last mentioned pair of holders into loading position at said loading station.

6. A machine tool as defined in claim 5, in which the unloadng means unloads said last mentioned pair of holders sequentially.

7. A machine tool as defined in claim 1, in which said work holders are located on said table with reference to the indexed positions of said table to position work pieces carried by said holders on said table in position to be engaged successively by said machining mechanisms at successive indexed position of said table.

8. A machine tool as defined in claim 1, in which said work holders comprise substantially radially outwardly open pockets, movable spring pressed latched means engageable with a side of a work piece in each pocket, substantially radially movable wedge means operable to lock said latch means, and means on said frame engageable with said wedge means during index travel of each pocket from the final machining station to the loading station to release said wedge means from wedging engagement with said latch means to release the work pieces for unloading.

9. A machine tool as defined in claim 8, comprising spring pressed ejector means engageable with each work piece as it moves in index travel of said table beyond the final machining station to be moved thereby to a position in which its spring is increasingly stressed to urge said ejector in a direction to eject the finished work piece from its pocket.

10. A machine tool as defined in claim 1 in which said work holders are six in number, spaced apart about the axis of the table at intervals of 60°, and in which said machining mechanisms are three in number and positioned to machine parallel surfaces in workpieces in all six holders at a single stroke, and to machine surfaces at 60° angles after three successive indexing of the work table by 120°.

11. A machine tool as defined in claim 10, in which said machining mechanisms are three elongated broaches oriented relative said table such that each broach machines two workpieces on each stroke.

* * * * *